United States Patent
Jones

(10) Patent No.: US 9,003,990 B2
(45) Date of Patent: Apr. 14, 2015

(54) WATERBORNE CRAFT AND FIN INCORPORATING AIR CONDUITS FOR DRAG REDUCTION

(76) Inventor: Cameron Grant Jones, Auckland (NZ)

( * ) Notice: Subject to any disclaimer, the term of this patent is extended or adjusted under 35 U.S.C. 154(b) by 326 days.

(21) Appl. No.: 13/319,161

(22) PCT Filed: May 7, 2010

(86) PCT No.: PCT/NZ2010/000087
§ 371 (c)(1),
(2), (4) Date: Jan. 18, 2012

(87) PCT Pub. No.: WO2010/128870
PCT Pub. Date: Nov. 11, 2010

(65) Prior Publication Data
US 2012/0103240 A1    May 3, 2012

(30) Foreign Application Priority Data
May 8, 2009    (NZ) .......................... 576833

(51) Int. Cl.
B63B 1/38    (2006.01)
B63B 1/34    (2006.01)
B63B 35/79   (2006.01)
F15D 1/12    (2006.01)
B63B 3/38    (2006.01)

(52) U.S. Cl.
CPC ... F15D 1/12 (2013.01); B63B 1/38 (2013.01); B63B 3/38 (2013.01); B63B 35/7906 (2013.01); B63B 35/7926 (2013.01); B63B 35/793 (2013.01); Y02T 70/122 (2013.01)

(58) Field of Classification Search
USPC ..... 114/126–143, 274, 278, 67 A, 67 R, 152; 441/74, 79
See application file for complete search history.

(56) References Cited

U.S. PATENT DOCUMENTS

| 2,663,276 | A |   | 12/1953 | Ouellet |
|---|---|---|---|---|
| 5,653,189 | A | * | 8/1997 | Payne .......................... 114/274 |
| 6,748,891 | B2 |   | 6/2004 | Takahashi |
| 6,901,873 | B1 | * | 6/2005 | Lang et al. .................... 114/274 |
| 2006/0231004 | A1 | * | 10/2006 | Stubblefield et al. ....... 114/67 A |
| 2008/0261470 | A1 |   | 10/2008 | Jones |

FOREIGN PATENT DOCUMENTS

| GB | 997737 |   | 7/1965 |
|---|---|---|---|
| RU | 2104898 | C1 * | 2/1998 |
| WO | WO2006/135256 |   | 12/2006 |
| WO | WO2006135256 | * | 12/2006 |

OTHER PUBLICATIONS

International Search Report, PCT/NZ2010/000087, Aug. 27, 2010.

* cited by examiner

*Primary Examiner* — Stephen Avila
*Assistant Examiner* — Anthony Wiest
(74) *Attorney, Agent, or Firm* — Young & Thompson

(57) ABSTRACT

The invention comprises a waterborne craft having a hull, board or base, and a fin, keel, centerboard or the like. One or more air conduits exit the hull, board or base at or adjacent at least one side of the fin, keel or centerboard, or exit the fin, keel, or centerboard, excluding the leading edge of the fin, keel or centerboard in use, in a position such that the conduit in use provides or the conduits in use provide air to a position at or adjacent at least one side of the fin, keel or centerboard.

10 Claims, 24 Drawing Sheets

WATERBORNE CRAFT AND FIN INCORPORATING AIR CONDUITS FOR DRAG REDUCTION

TECHNICAL FIELD OF THE INVENTION

The invention relates to a Waterborne Craft, particularly though not necessarily solely a surf board.

BACKGROUND OF INVENTION

Surfing has been in vogue as a pastime, recreational activity and sport for some time. In order to function adequately a surfboard has on its underside at least one fin. Usually three fins are used, two side fins towards the rear of the board and a central fin between the side fins and often placed generally rearward of the side fins. The fin or fins assist in creating stability and reduce unwanted leeward motion. Fins, keels and centerboards are used in other waterborne vessels for similar purposes. However the fin, keel or centerboard itself in its contact with the water creates drag and reduces the performance of the surfboard or other waterborne craft.

OBJECT OF THE INVENTION

It is an object of the invention to provide a waterborne craft which will obviate or minimise some of the disadvantages and limitations of the known art or which will at least provide the public with a useful choice.

SUMMARY OF INVENTION

In a first aspect the invention consists in a waterborne craft having a hull, board or base, and a fin, keel, centerboard or the like; one or more air conduits exiting the hull, board or base at or adjacent at least one side of the fin, keel or centerboard, or exiting the fin, keel, or centerboard, excluding the leading edge of the fin, keel or centerboard in use, in a position such that the conduit in use provides or the conduits in use provide air to a position at or adjacent at least one side of the fin, keel or centerboard.

Preferably the conduit or conduits take the form of apertures through the hull, board or base or apertures through the fin, keel, centerboard or the like or both.

Preferably, the waterborne craft has a plurality of fins, keels or centerboards and an aperture or apertures positioned to provide air to at least one side face of at least one said fin, keel or centerboard.

Preferably the aperture or apertures comprise one or more apertures through the hull, board or base at or adjacent at least one side of at least one fin, keel or centerboard.

Preferably the apertures have a reduced diameter at or adjacent the air exit end thereof.

Preferably at least one fin, keel or centerboard has three or four apertures therebeside.

In a further aspect the invention consists in a fin, keel, centerboard or the like having apertures therethrough through which air can pass in use, the apertures exiting on the surface of the fin, keel, centerboard or the like other than at the leading edge.

BRIEF DESCRIPTION

The invention will now be described, by way of example only, by reference to the accompanying drawings:

FIG. 1 is a transverse cross section through part of a surfboard showing a fin and air conduit in accordance with a first preferred embodiment of the invention FIG. 2 is an underneath perspective view of a surfboard and fin of the type shown in FIG. 1, FIG. 3 is a view as in FIG. 1 of an alternative surfboard and fin, FIG. 4 is a view as in FIG. 2 of a surfboard and fin of the type of FIG. 3, FIG. 5 is a longitudinal cross section of a further alternative surfboard and fin, FIGS. 6 to 8 are each diagrammatic underneath perspective views of alternative fin and socket constructions for use in some forms of the invention, FIGS. 9 and 10 are transverse cross-sectional views of part of a surfboard and fin construction in still further alternative embodiments of the invention, FIG. 11 is an underneath perspective view of the invention as shown in FIGS. 9 and 10, FIGS. 12 to 15 are part longitudinal cross-sectional views of various embodiments of the invention, FIGS. 16 to 19 are underneath views of various embodiments of the invention, FIG. 20 is an underneath perspective view of a still further alternative embodiment of the invention, FIG. 21 is a transverse cross-sectional view of a still further alternative embodiment of the invention, FIGS. 22 and 23 are respectively an underneath and a top perspective view of a still further alternative embodiment of the invention, and FIG. 24 is a perspective view of a further alternative construction.

DESCRIPTION OF DRAWINGS

The following description will describe the invention in relation to preferred embodiments of the invention, namely a waterborne craft. The invention is in no way limited to these preferred embodiments as they are purely to exemplify the invention only and that possible variations and modifications would be readily apparent without departing from the scope of the invention. The invention will be described with reference to a surfboard and fin, but it will be appreciated that the invention may be used on a wide variety of waterborne craft having a board base or hull and carrying a fin, keel, centerboard or the like device.

The point of exit at the exiting end 8 is desirably of smaller dimension than the diameter of the remainder of the conduit 6. This will help prevent flow back of water into the conduit 6. The precise dimensions of the conduit 6 and the exiting end can be empirically determined and may vary depending on the type of board into which the invention is applied. However a maximum diameter of the conduit 6 is expected to be about 5 mm.

Figure 2:
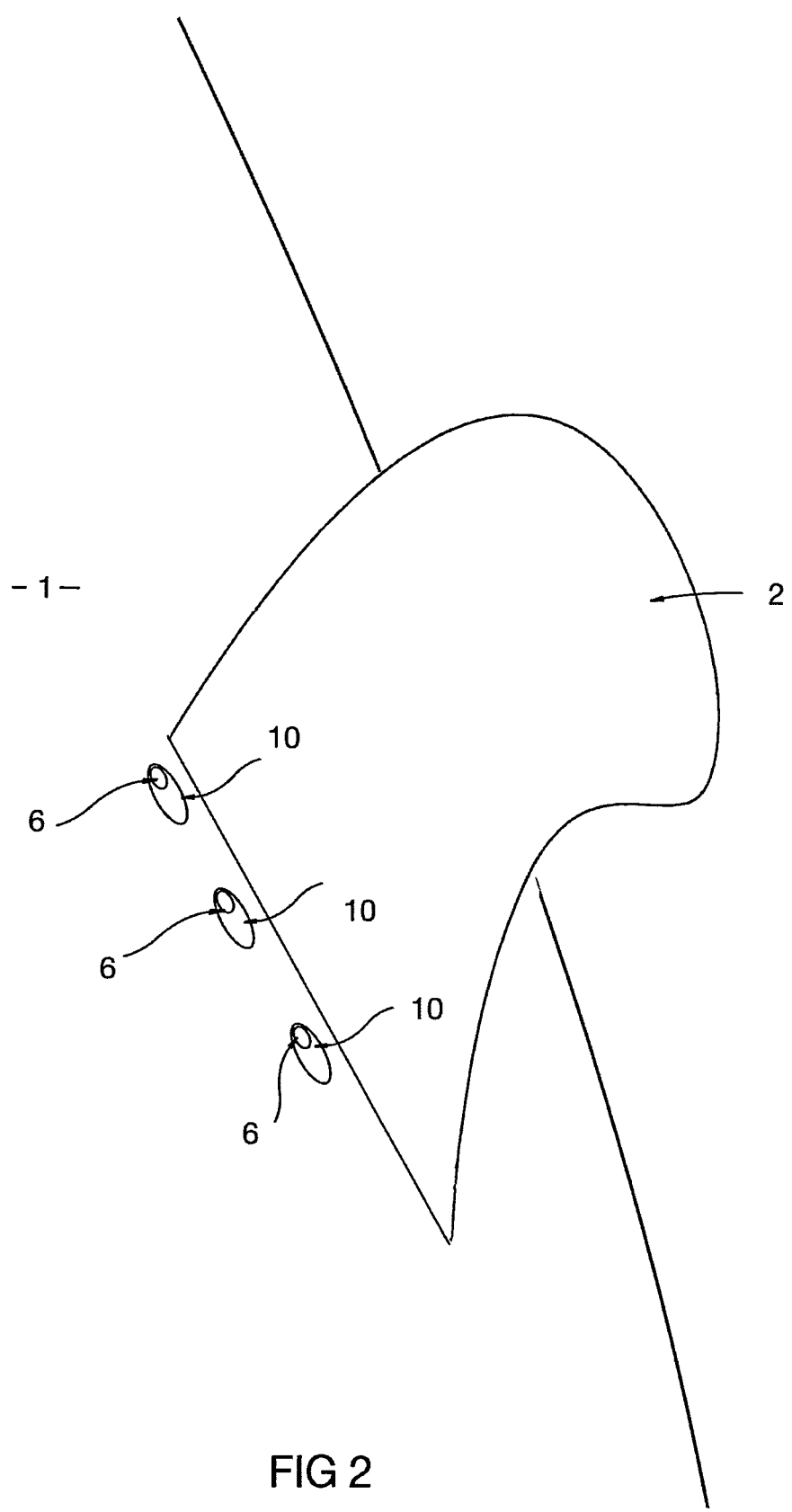

In FIG. 2 three conduits 6 are shown which exit into an optional oval depression 10 with the major axis of the depression 10 aligned substantially longitudinally of the board 1. In this embodiment of the invention the conduits 6 are arrayed substantially along the length of the fin 2 or at least the forward two thirds of the longitudinal extent of the fin 2.

Figure 3:
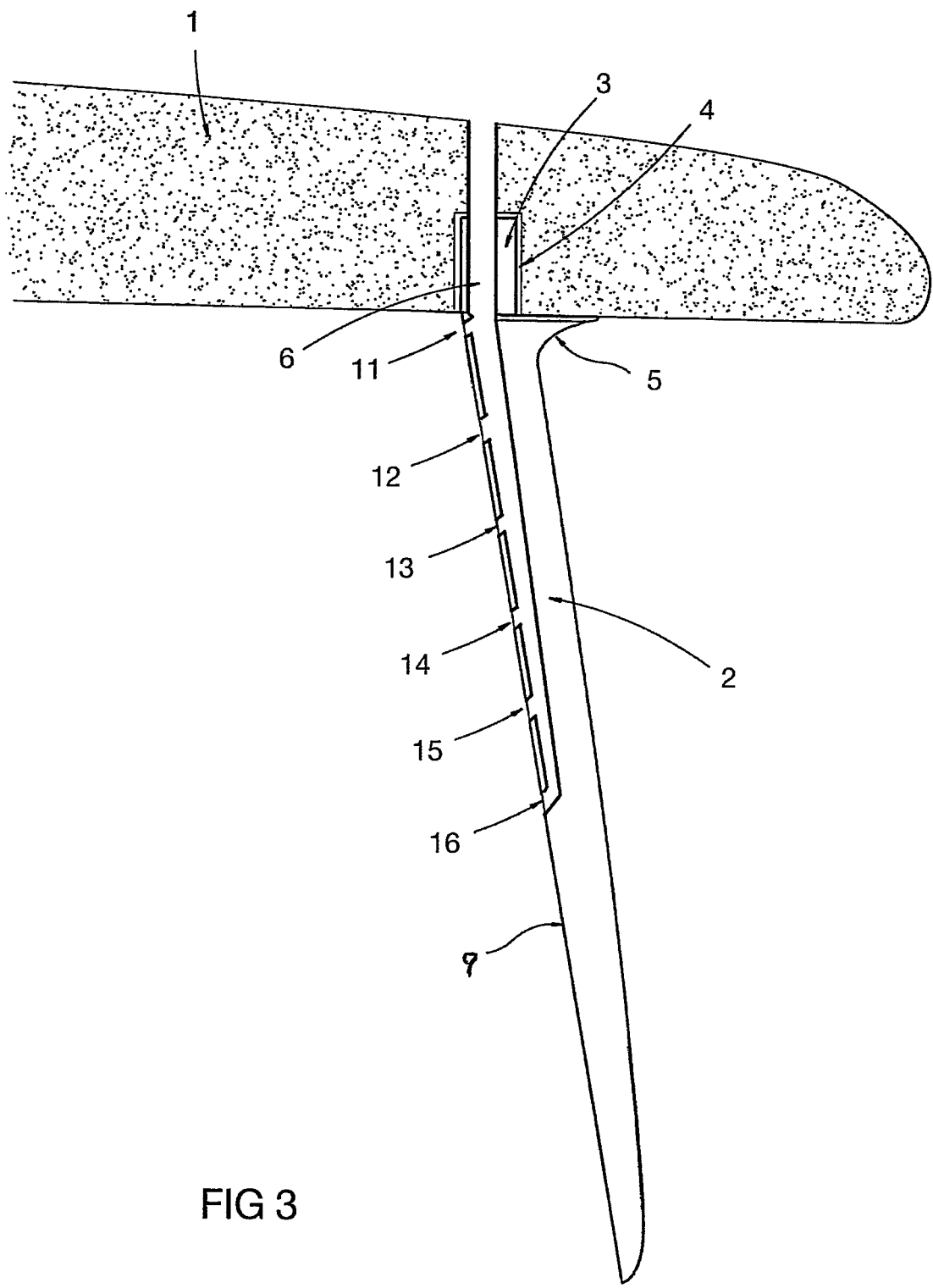
Figure 4:
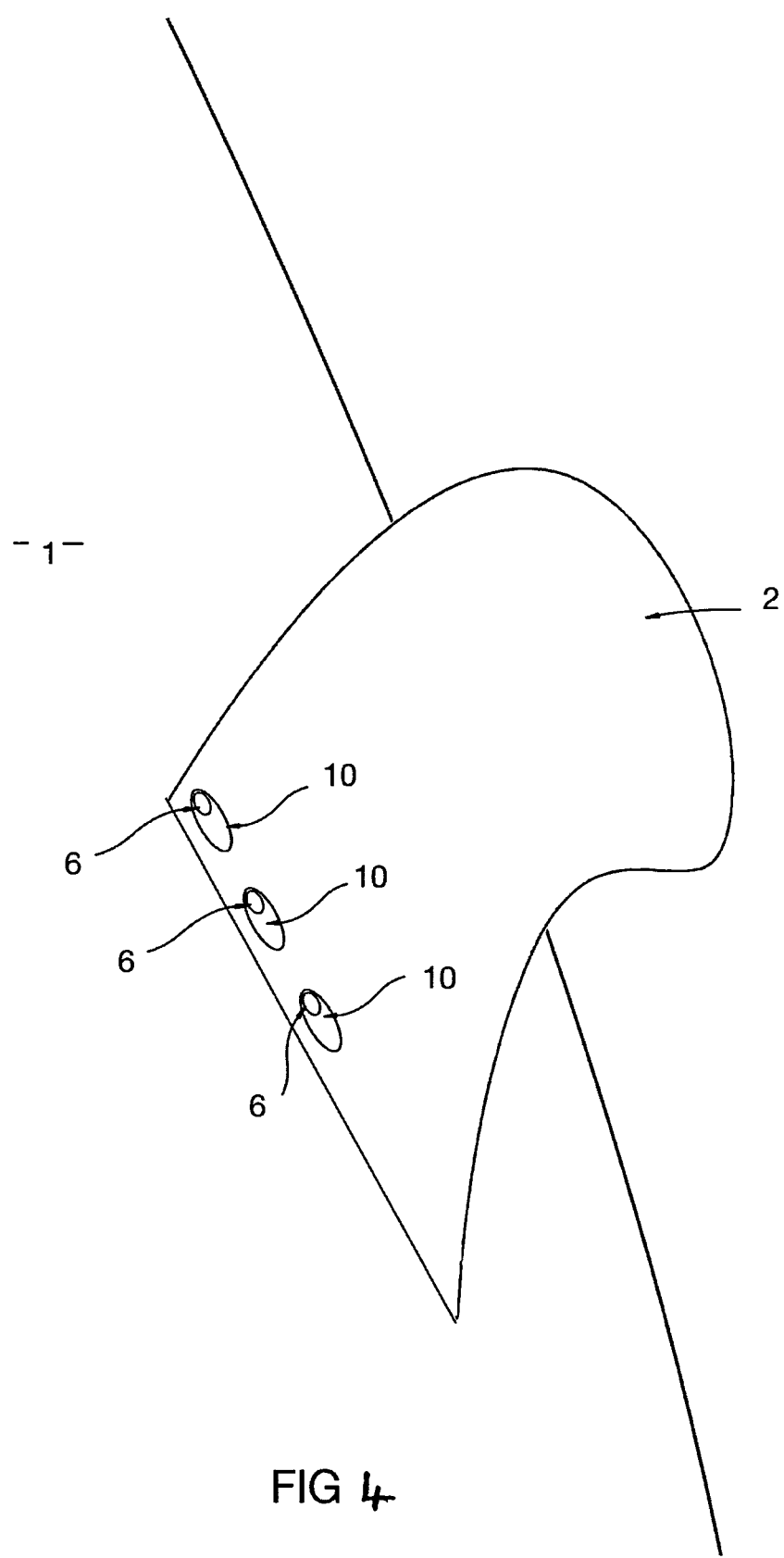
Figure 14:
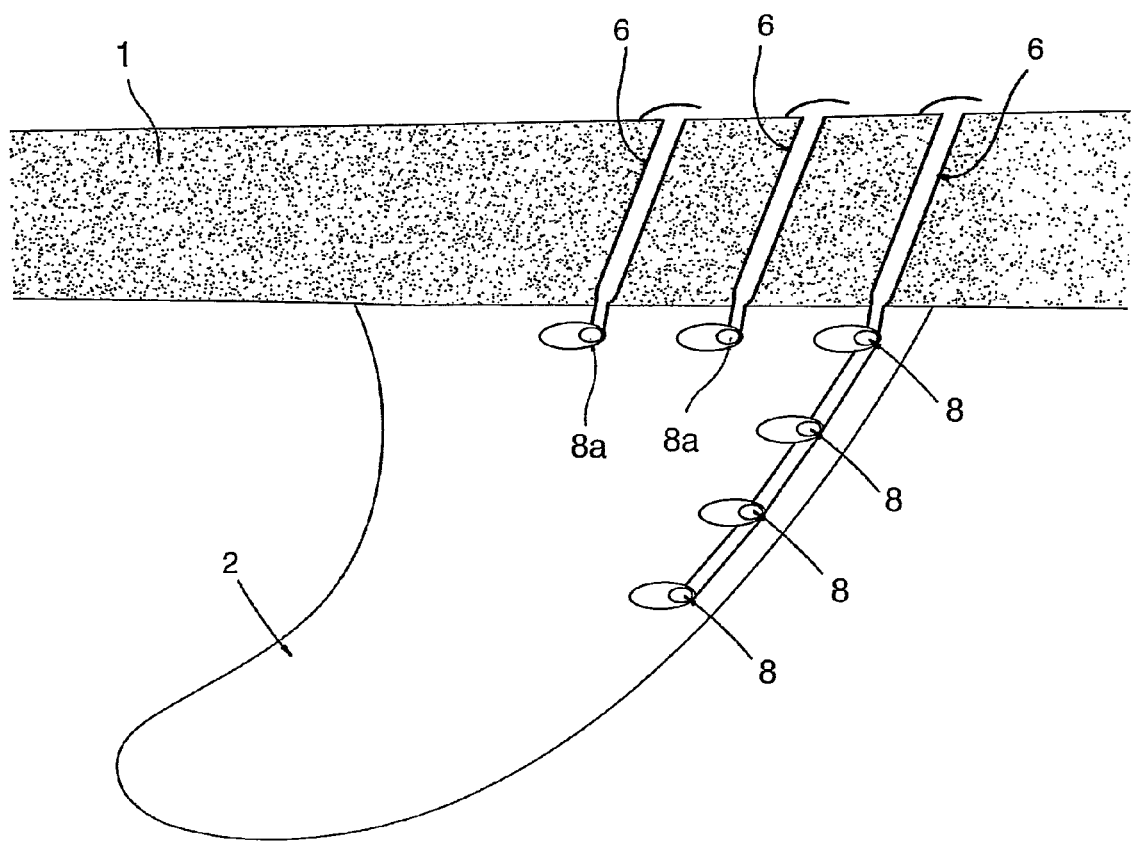

In the embodiment of FIG. 3 the conduit 6 runs through the tongue 3 and socket 4 and exits at least at position 11 in the inner face 9 of the fin 2. The conduit 6 as shown in FIG. 4 is extended at 12 and provides further exits at 12, 13, 14, 15 and 16. A similar construction is shown in FIG. 14 where multiple exits are provided across the face of the fin 2. The exits 11 to 16 are placed anywhere on the fin face except at or adjacent the leading edge of the fin 2 or adjacent the leading edge of any flap built into the fin 2.

In the construction of FIG. 4 the conduits 6 again exit at depressions 10. However the construction is similar to FIG. 3 in that the exits of the conduits are in the fin 2 near the conjunction of the board 1 and fin 2. Again three conduits 6 are shown.

Figure 5:
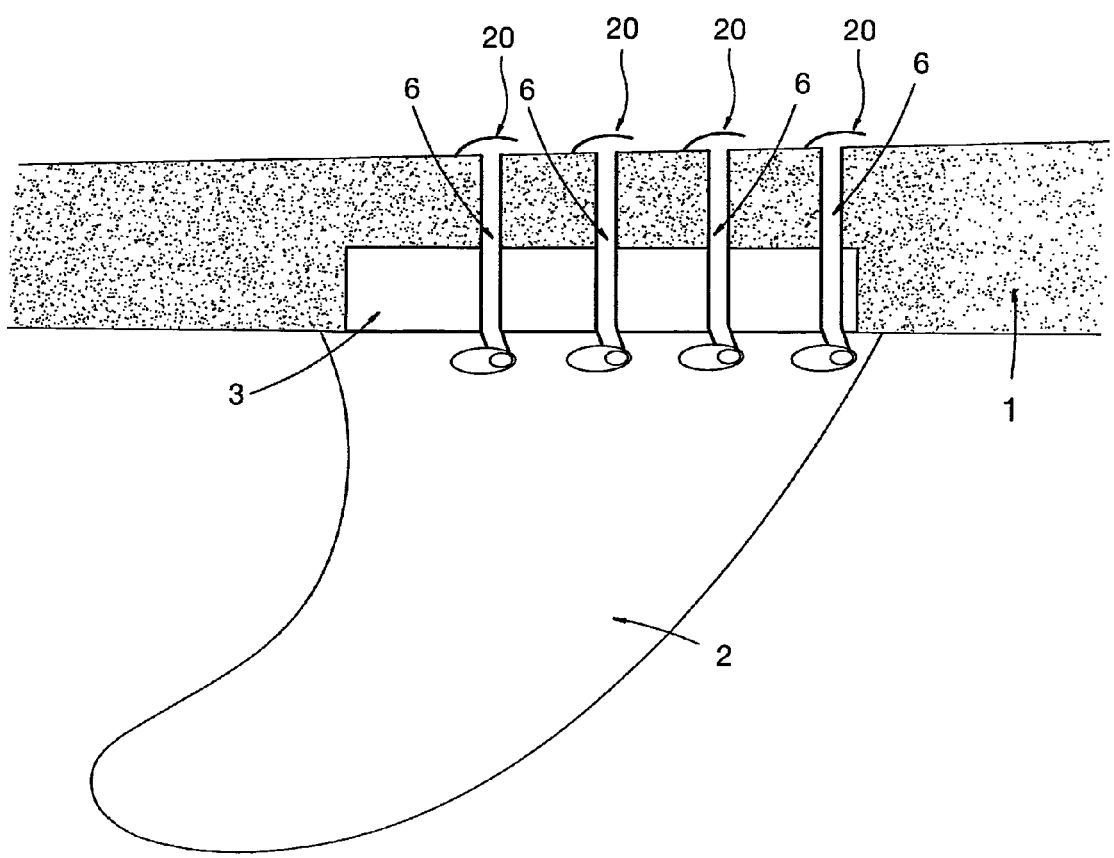
Figure 24:
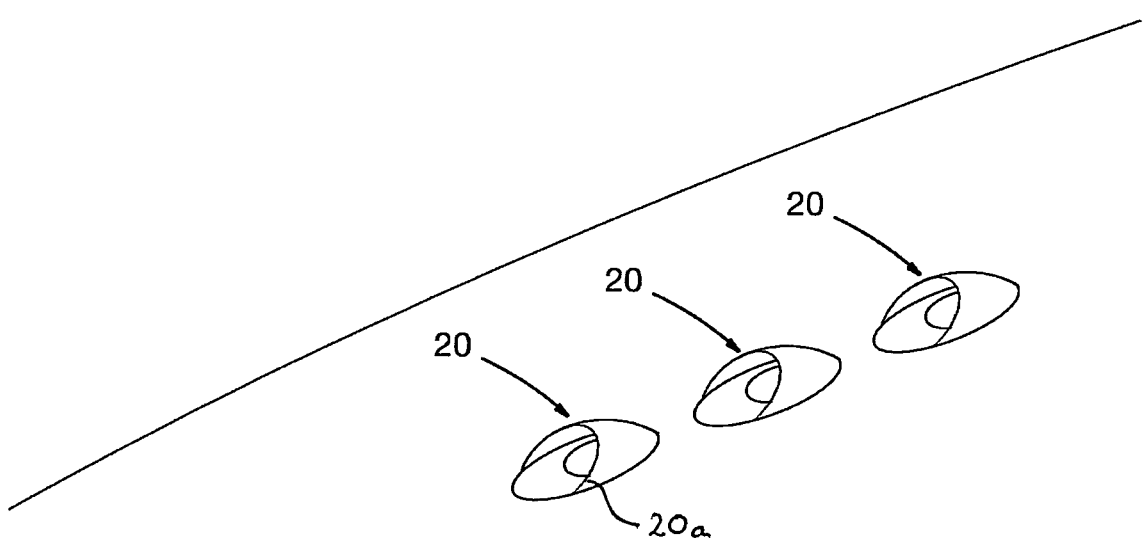

The construction of FIG. 5 is similar save that four conduits 6 are shown. In this embodiment the inlet ends are protected by a cover 20 which is of a somewhat rigid construction so that in use if the user steps on the board at the position of the conduits 6 the conduits 6 are not substantially closed by the user's foot. The covers 20 could be in the form of a concave disk such as disc 20 shown in FIG. 24 with a segment 20a removed to provide the air inlet channel.

The conduits can be drilled and sealed or may be incorporated during the manufacturing process.

Figure 6:
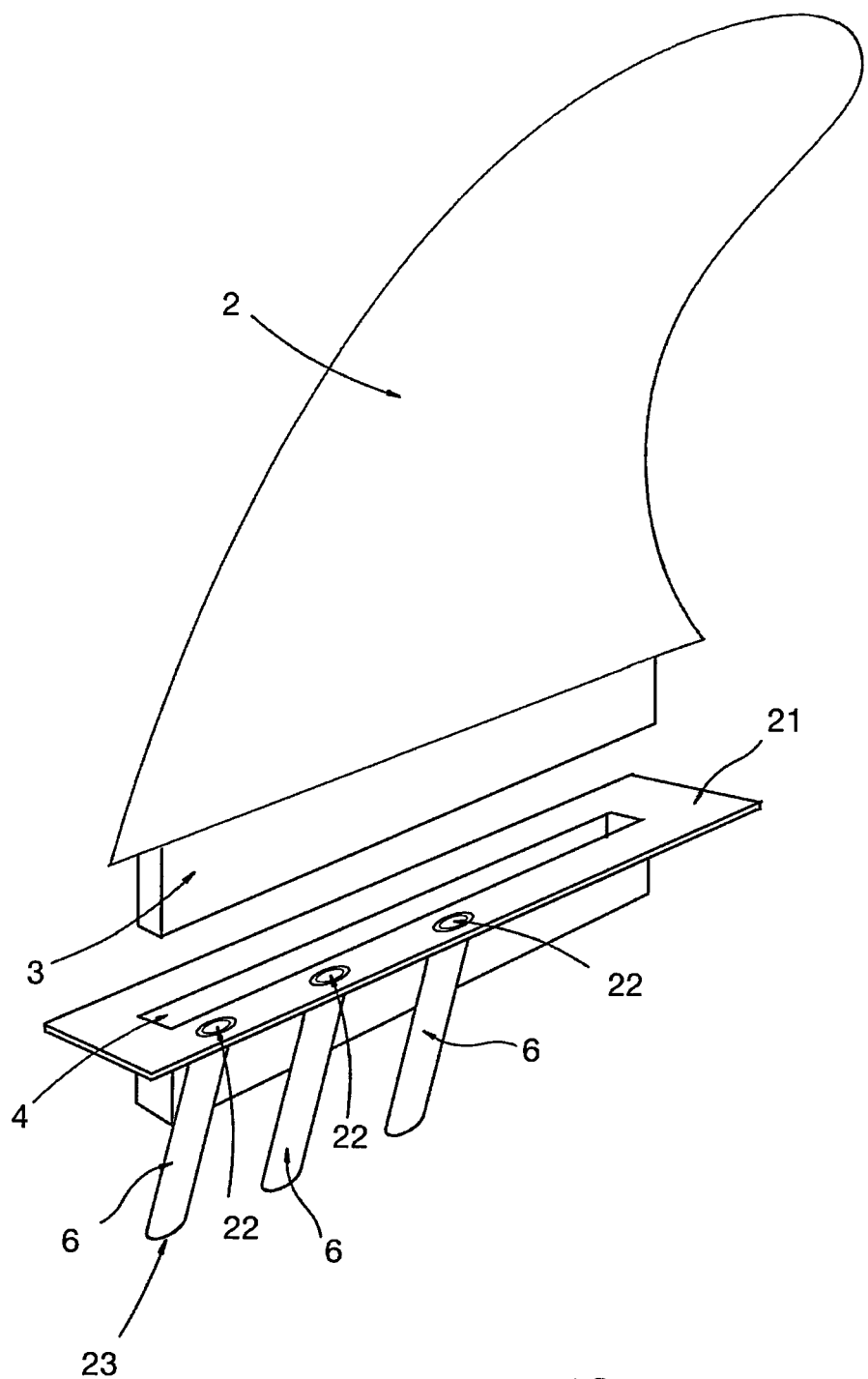
Figure 7:
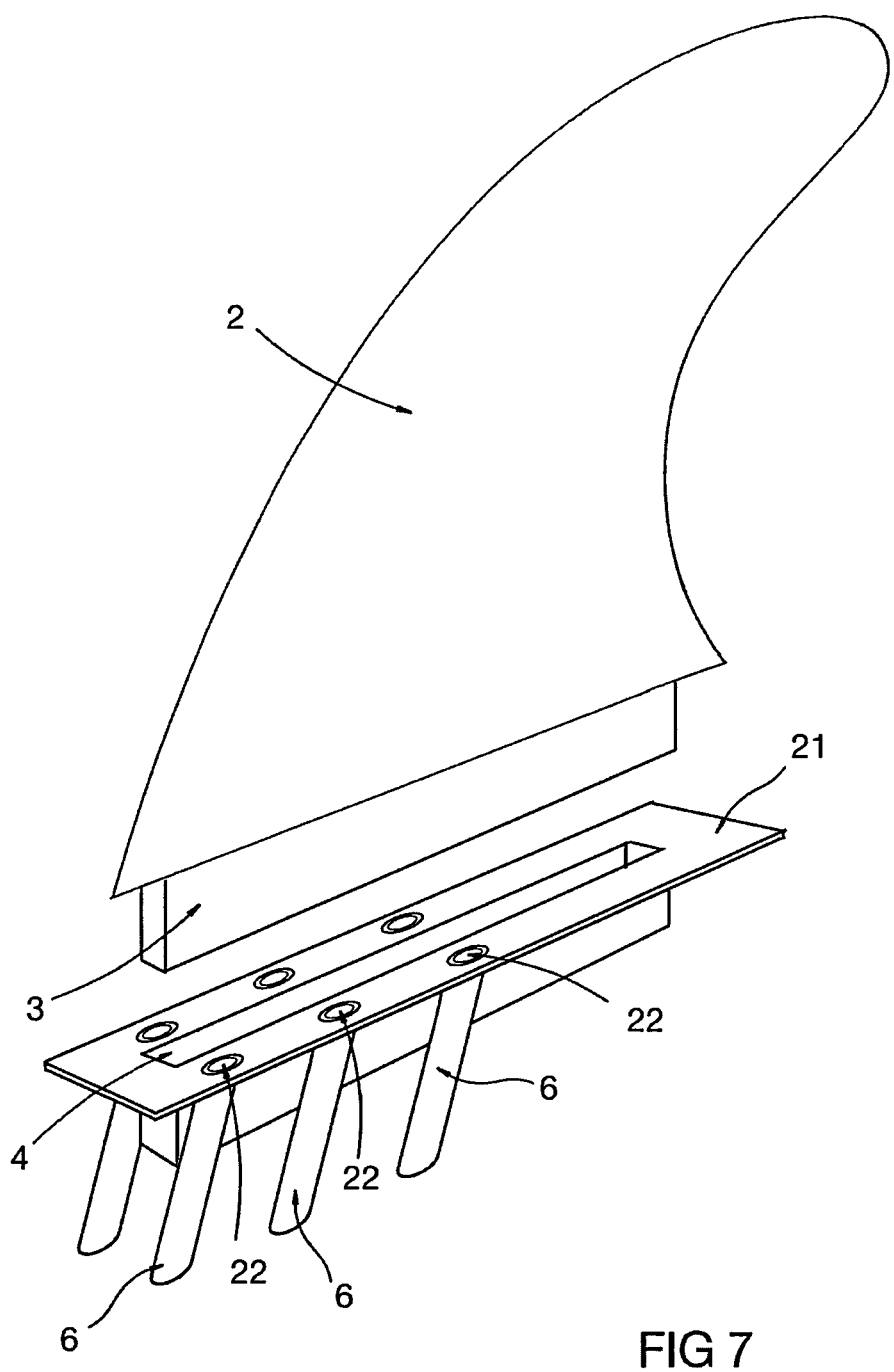
Figure 8:
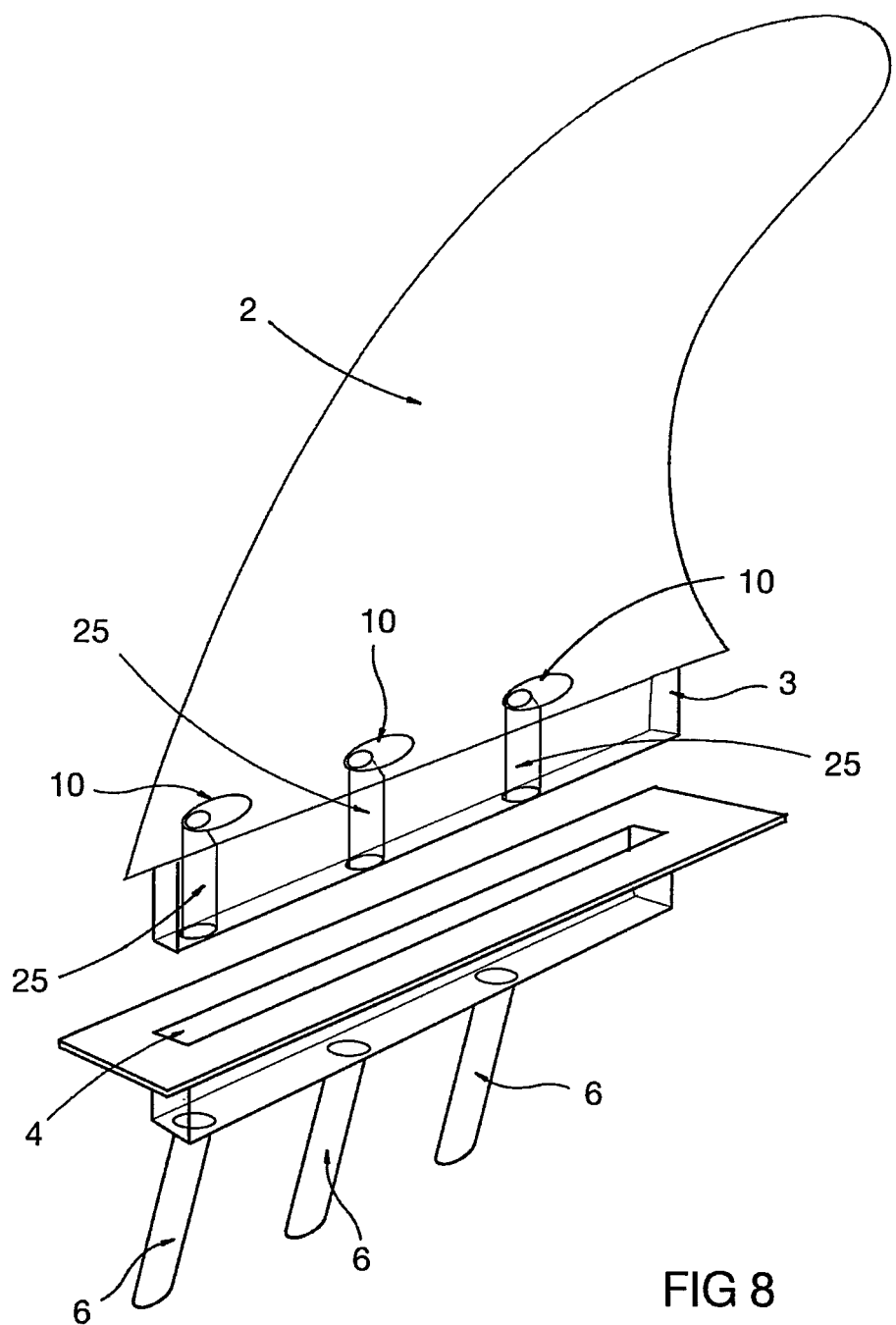

The constructions of FIGS. 6 to 8 show methods by which the conduits can be incorporated during manufacture. In FIG. 6 a fin 2 carrying a tongue 3 is provided. Also provided is a socket 4 into which tongue 3 is secured in use. The socket 4 has a circumferential flange 21 onto which conduits 6 are formed. The conduits 6 extend from the flange 21 at openings 22. The conduits may be open or closed at the remote end 23 which should be long enough to extend to the opposite face of the board 1 or indeed a little past the opposite face of the board 1 so that the conduits 6 can be cut to the required length and sealed to the gel coat of the board. The construction of FIG. 6 is intended to be for a side fin.

FIG. 7 is somewhat similar save that conduits 6 are provided on each side of the fin 2 making the construction particularly suitable for a centre fin but which could also be used for a side fin if desired.

FIG. 8 shows a construction somewhat like the construction of FIG. 4. The conduits 6 are formed from the bottom of the socket 4 and meet or at least abut passageways 25 within the fin 2 to exit at depressions 10.

Figure 9:
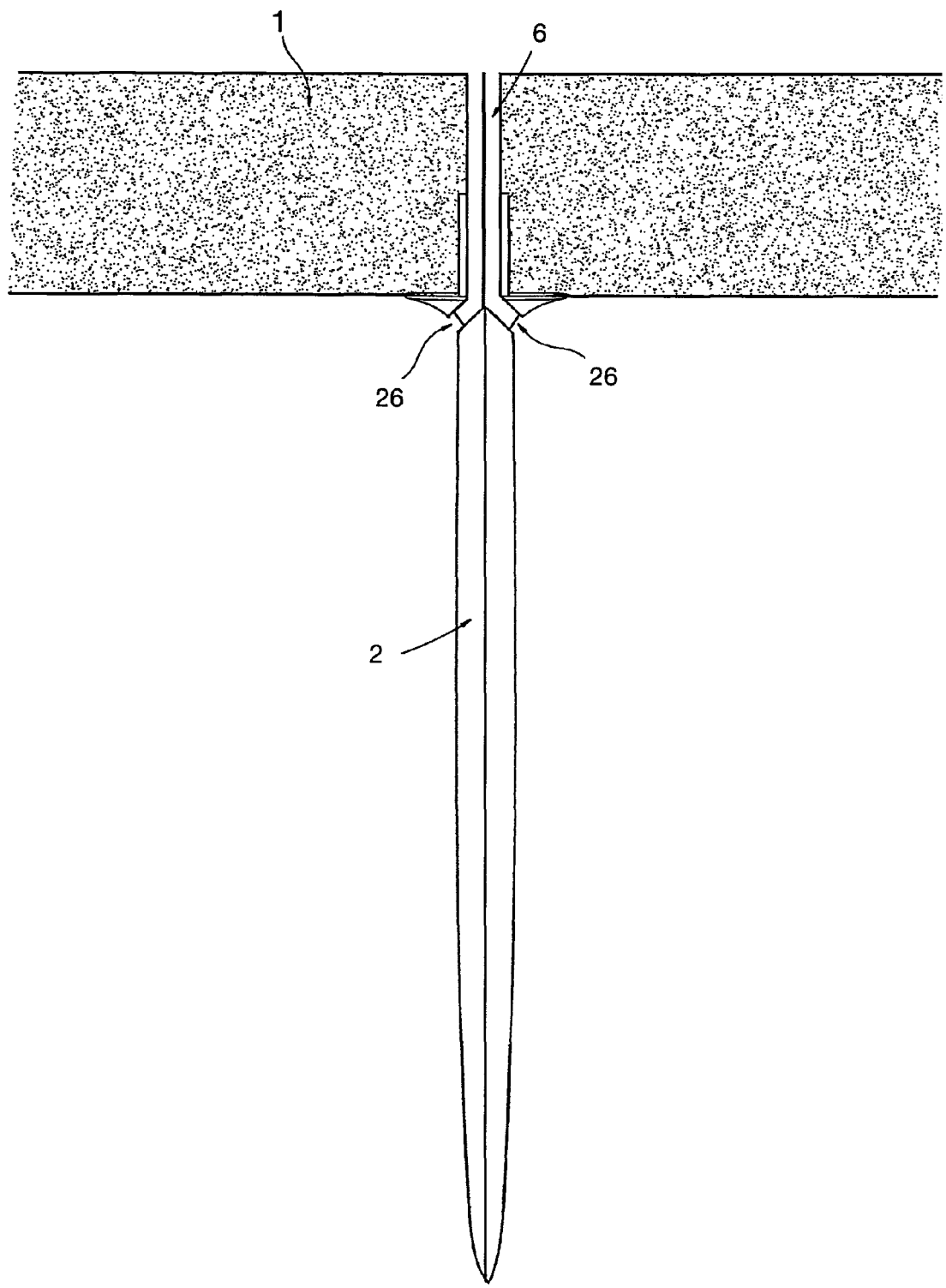

FIG. 9 shows a further alternative construction in which a split conduit 6 is provided exiting at outlets 26 each side of the fin 2 at or adjacent the conjunction of the board 1 and fin 2. Again this is arrangement is most suitable for a centre fin but could be used for a side fin.

Figure 10:
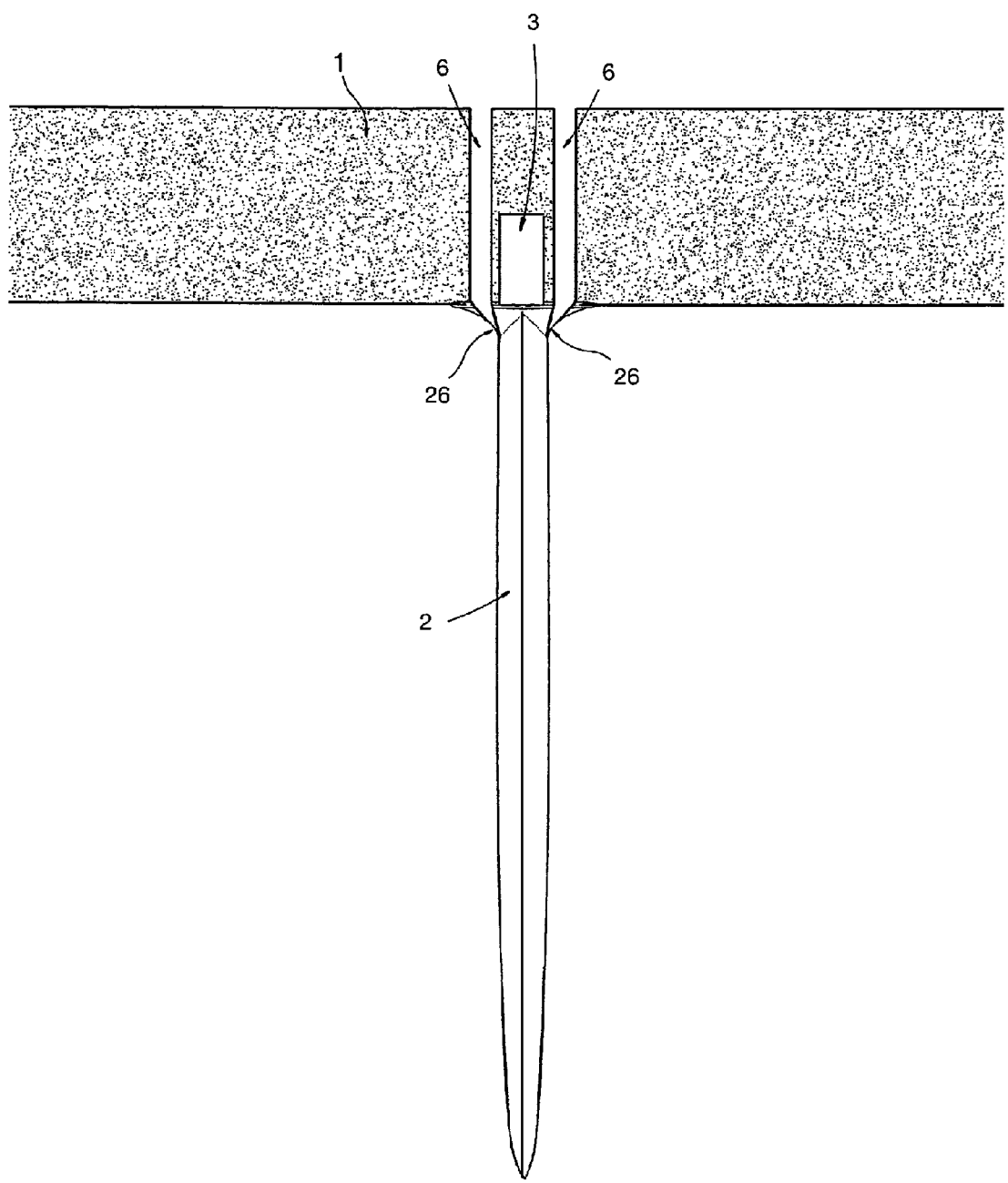

In FIG. 10 an arrangement similar to FIG. 9 is used save that two conduits 6 are shown positioned each side of the fin 2 and the tongue 3. Again this is arrangement is most suitable for a centre fin but could be used for a side fin.

Figure 11:
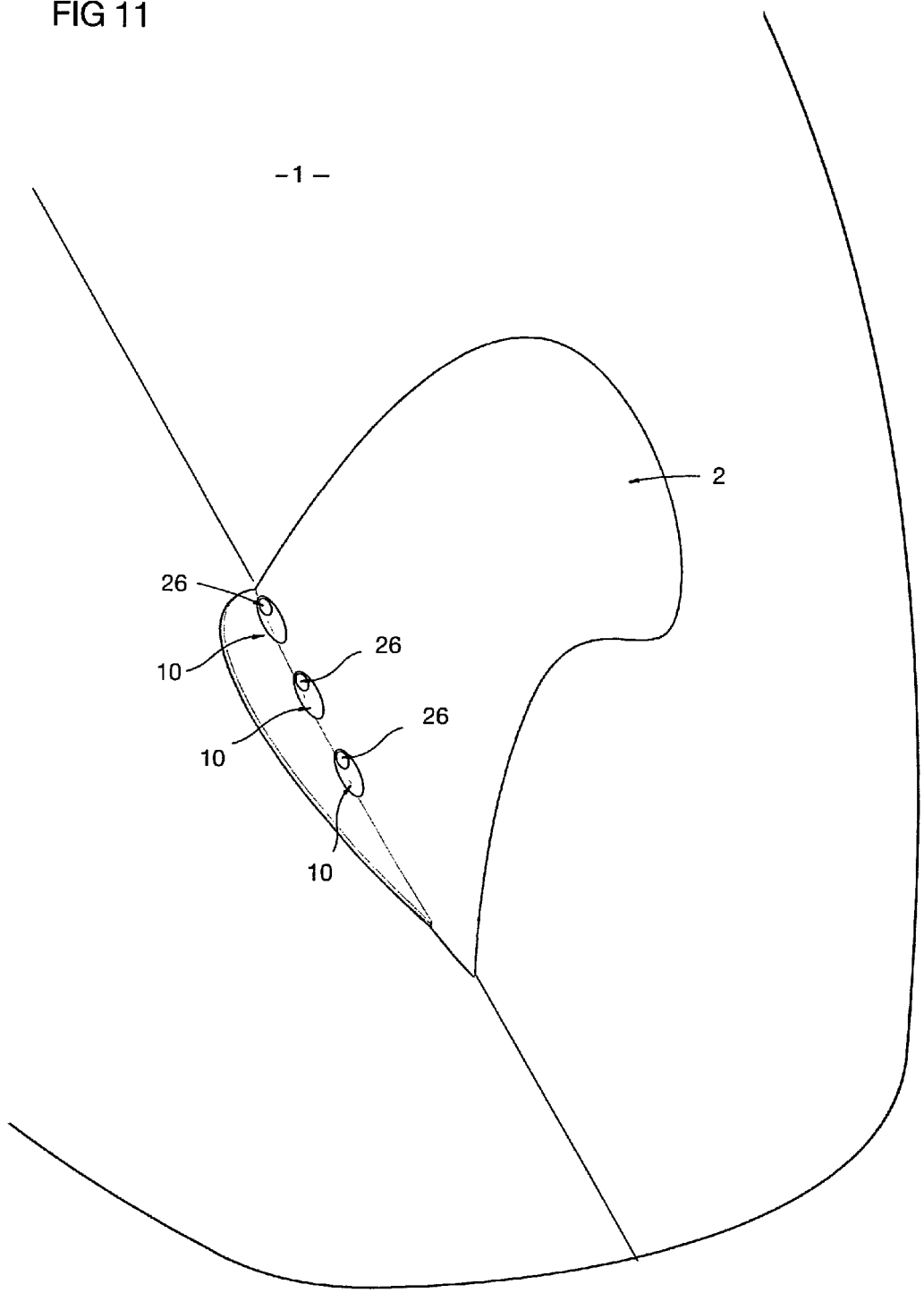

FIG. 11 is an underneath view of a construction such as would be seen in FIG. 9 or FIG. 10.

Figure 12:
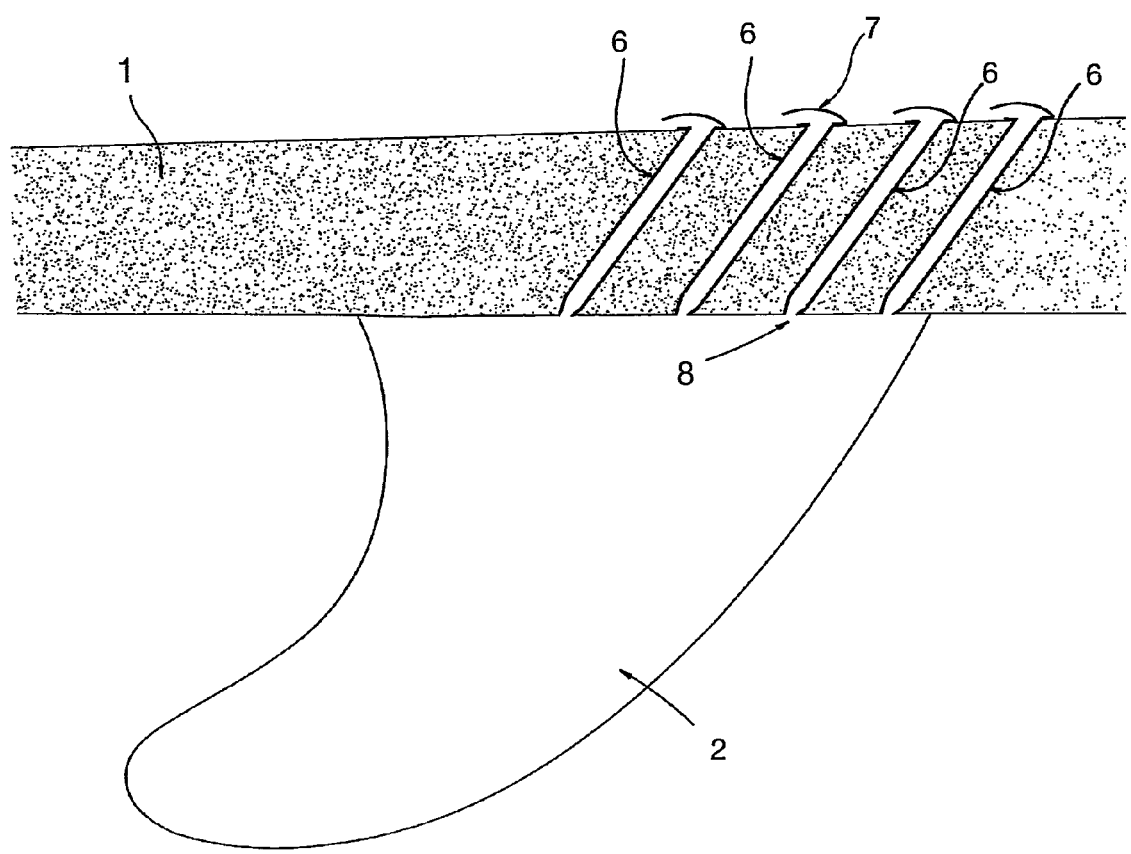

FIG. 12 shows a construction similar to that in FIG. 5 but the conduits 6 are angled rearwardly downwardly. This may increase the uptake of air as it allows some pressure at the inlet end 7 of the conduit as well as the suction at the exiting end 8 due to the suction caused by the entraining effect of the water passing the exiting ends 8 of the conduits 6. Also the FIG. 12 construction has the exiting ends 8 exiting beside the fin 2 rather than therethrough. The angle of the conduit 6 may be about 50° to the longitudinal axis of the board 1 but the angle could vary over quite a wide range such as 30° to 70°. I believe that the angle should not be perpendicular to the board as water may then flow back too easily.

Figure 13:
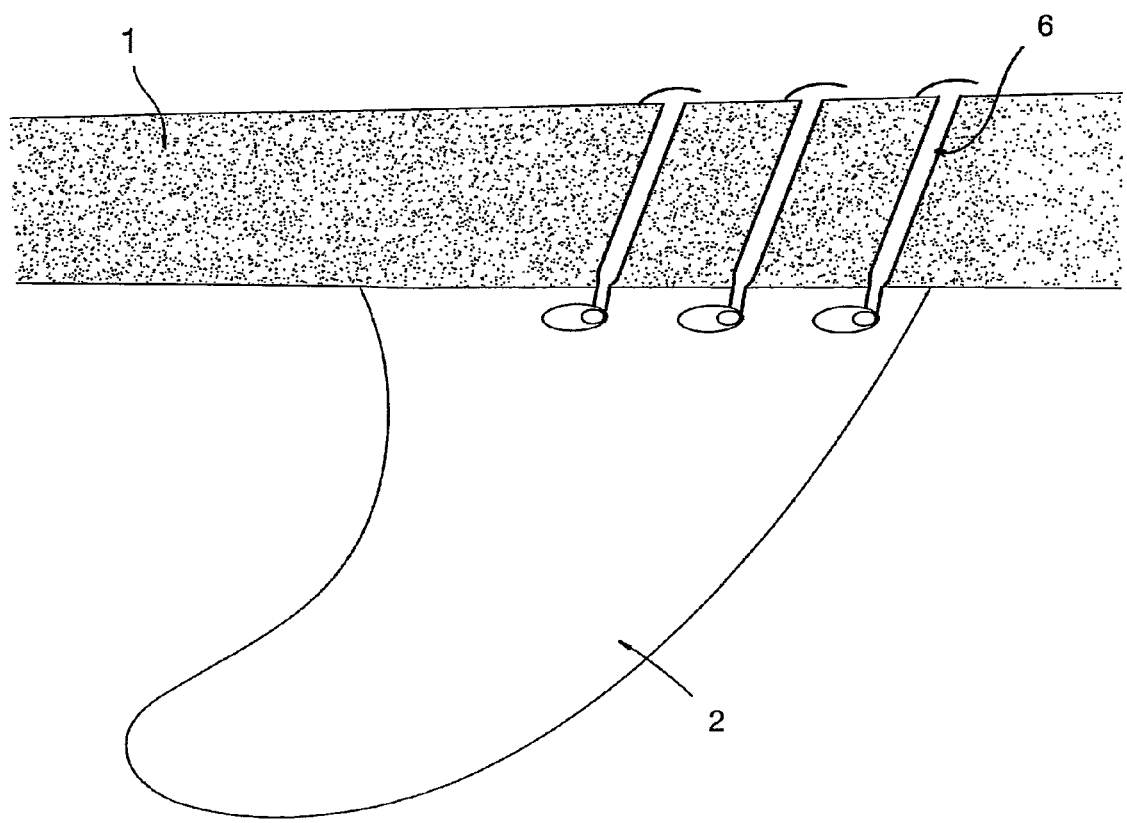

FIG. 13 shows a construction having three conduits 6 which exit through the fin 2, flange 21 or bracing flange 5. Again the conduits 6 are angled rearwardly downwardly.

In the construction of FIG. 14 the leading conduit 6 has a plurality of exits 8 similar to those shown in FIG. 4 but also provided are exits 8a arrayed as shown in FIG. 13.

Figure 15:
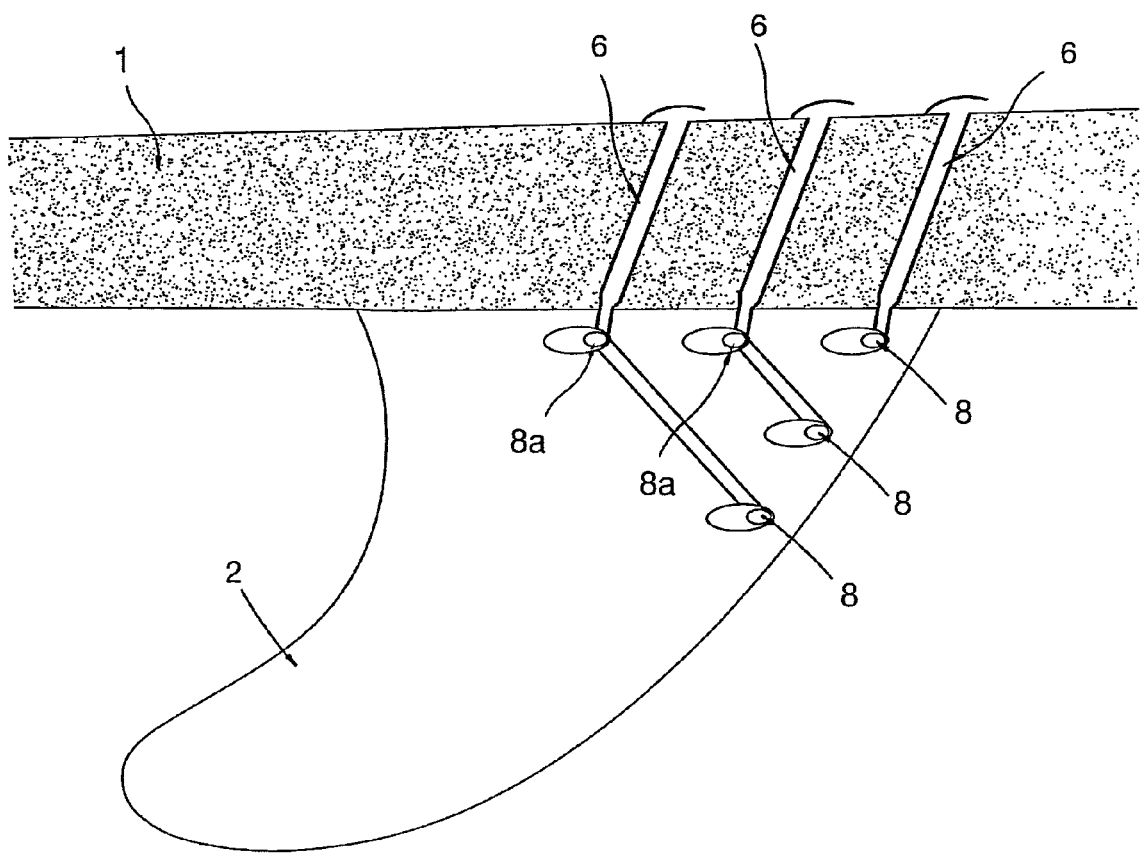

FIG. 15 shows a construction wherein the exits 8 and 8a are placed as for FIG. 14 but the conduits feeding the exits are re-arranged with the lower exits 8 being fed by the rearward conduits 6 past the exits 8a.

FIGS. 16 to 19 show fin arrangements.

Figure 16:
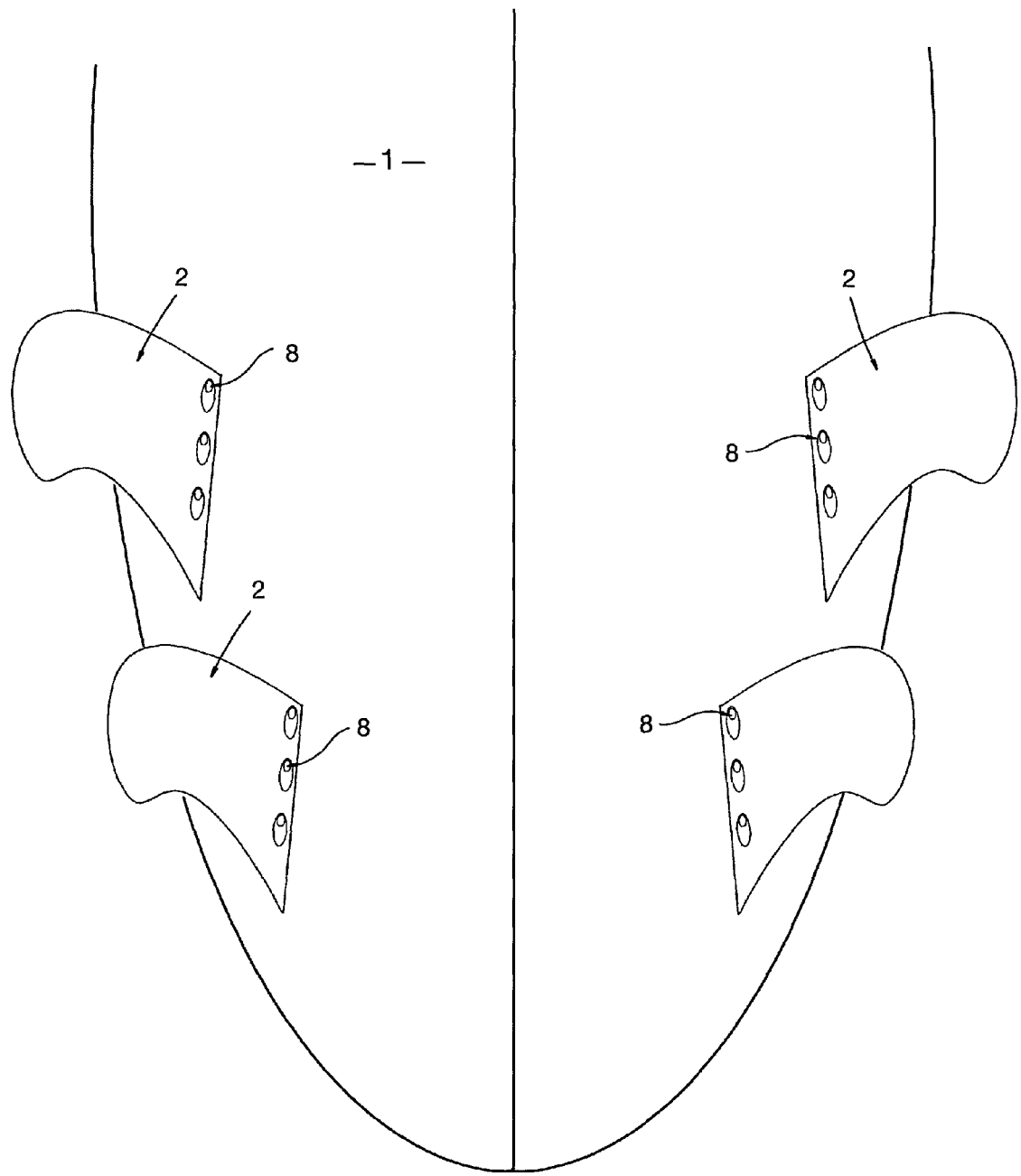

In FIG. 16 four fins 2 are provided each of which is a side fin. The exits 8 are on or adjacent the inner face of the fins 2. The exits are in the fins 2, or in flange 21 or bracing flange 5.

Figure 17:
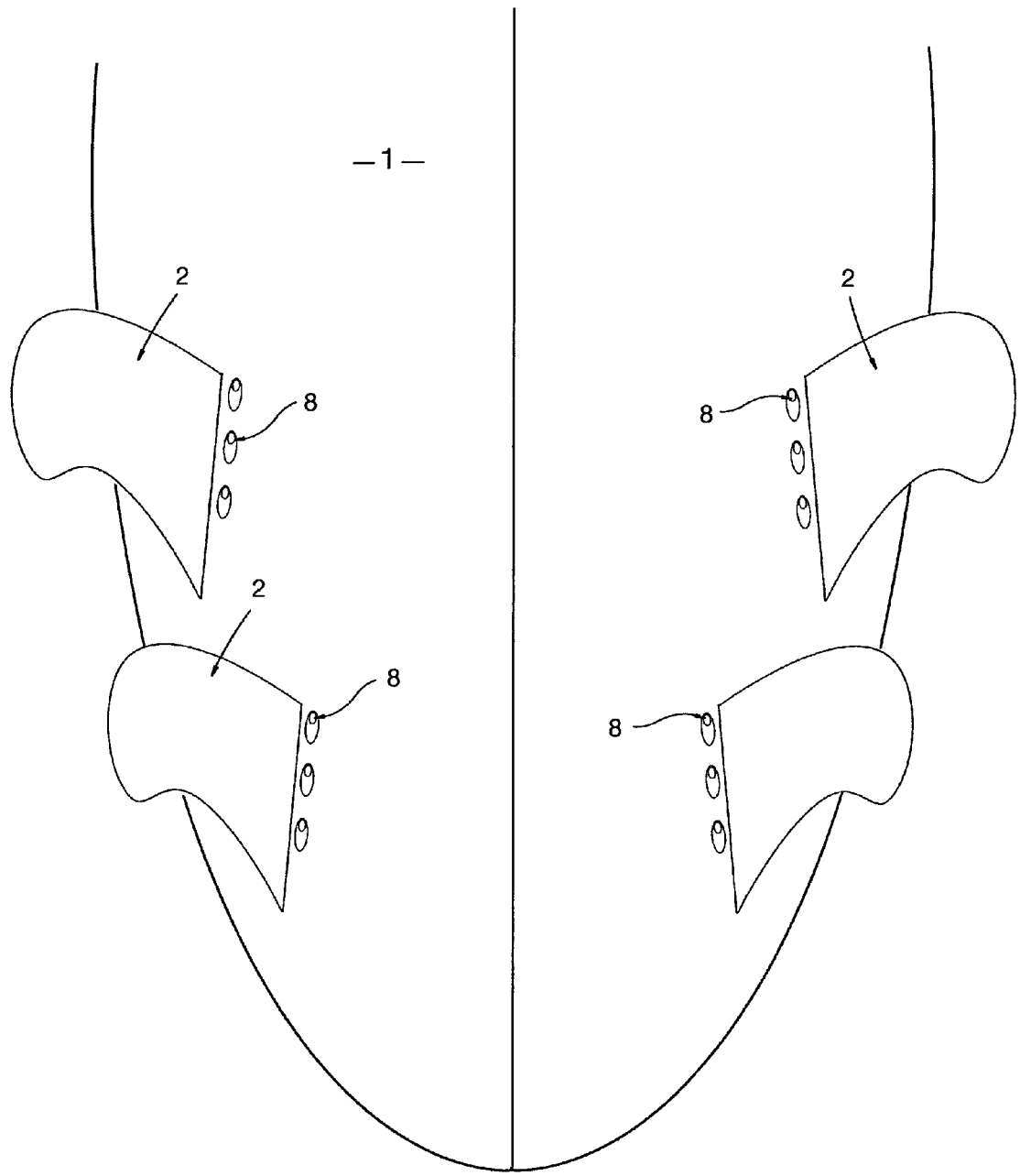
Figure 18:
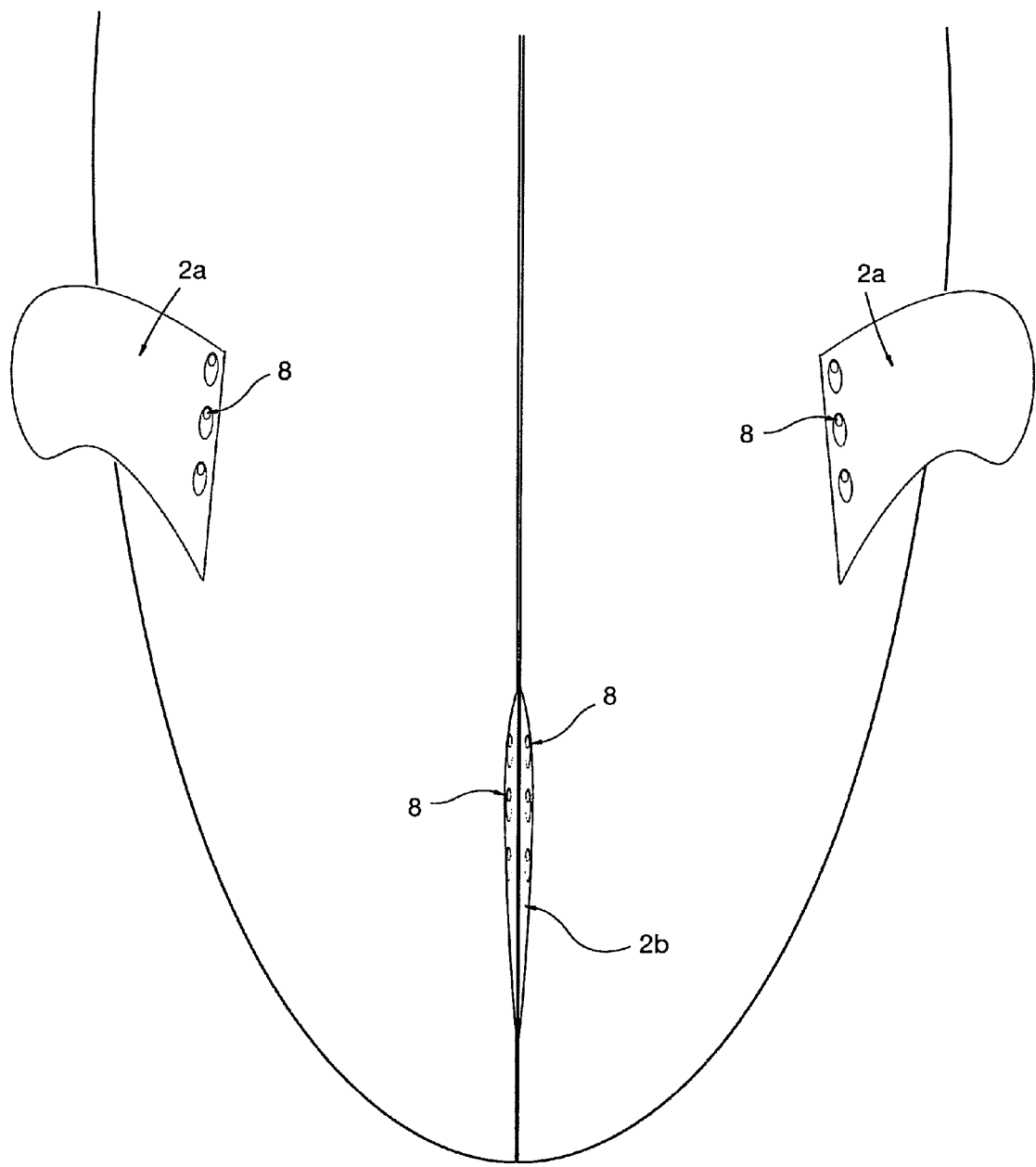

In FIG. 17 substantially the same structure is shown save that the exits 8 are beside the fin 2. FIG. 18 shows a three fin arrangement. Side fins 2a have exits as for FIG. 16 on the inner side of the fin 2a whilst the centre fin 2b has exits 8 on both faces of the fin 2b.

Figure 19:
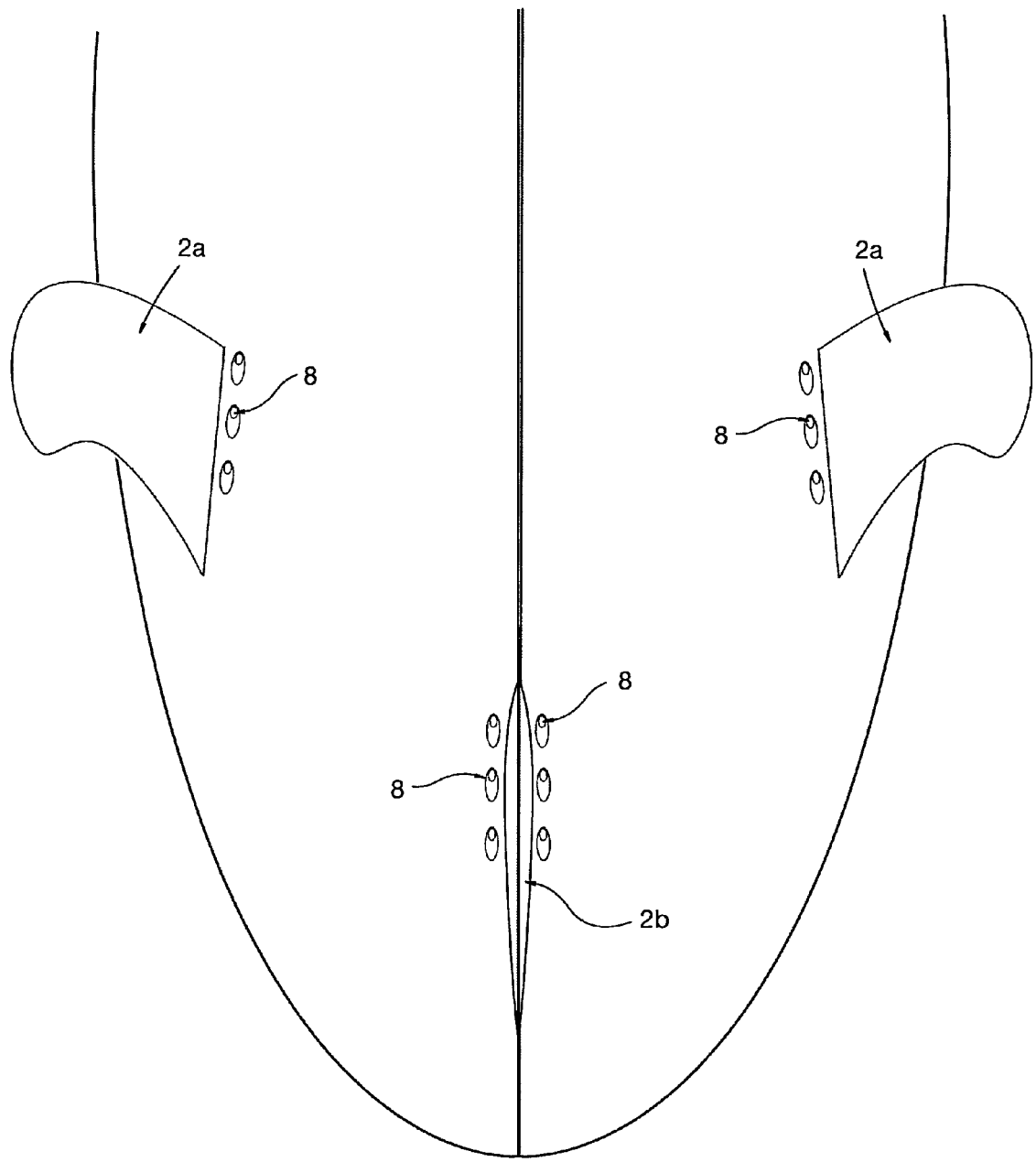

FIG. 19 shows a construction as for FIG. 18 but the exits 8 are as for FIG. 16.

Figure 20:
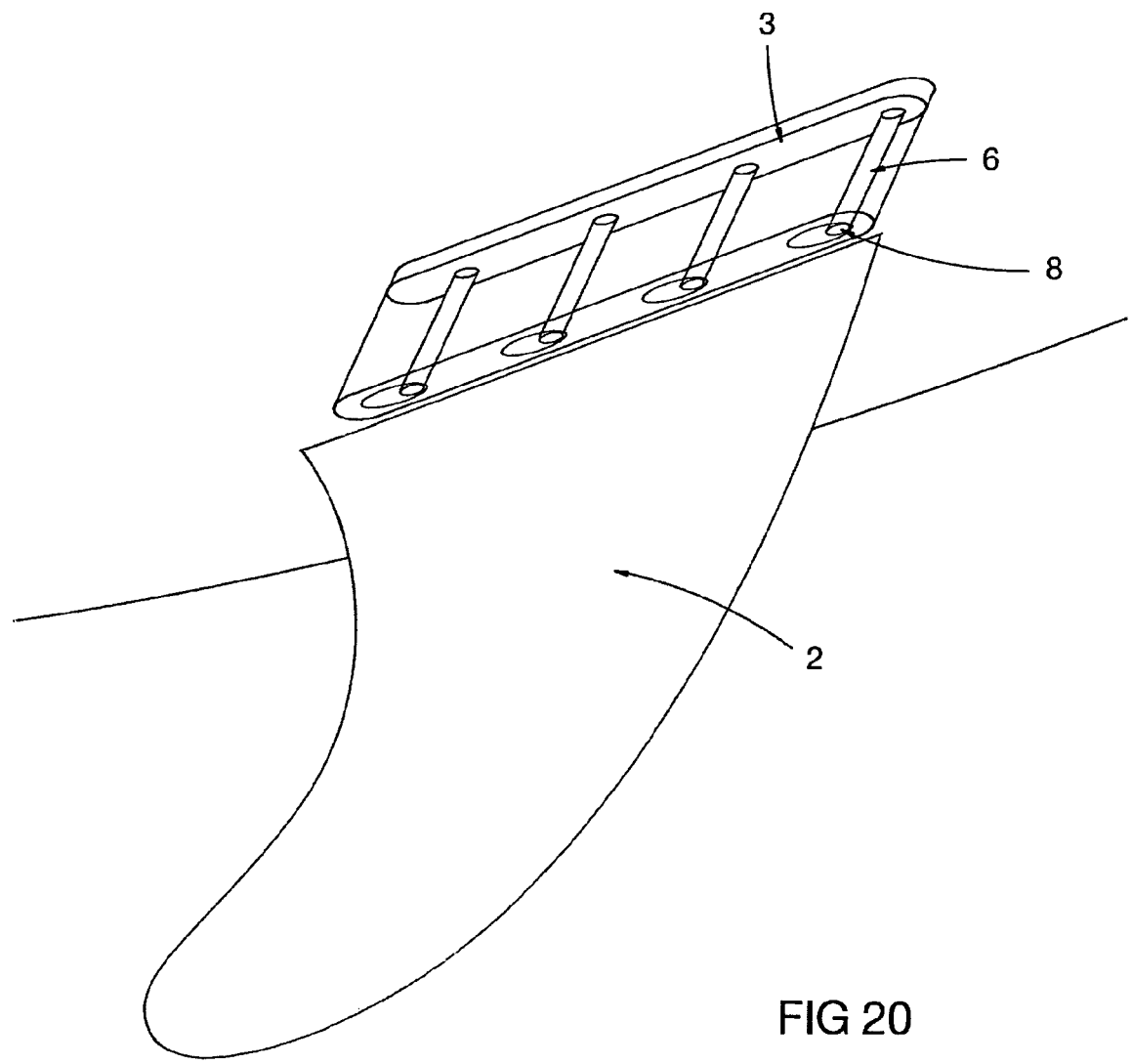

FIG. 20 shows a construction where the fin 2 and the socket 3 are manufactured as a unitary item. The exits 8 are shown beside the fin 2 but constructions where the exits are in the fin, in the flange 21 or in the flange 5 could be provided for example as shown in FIG. 11.

Figure 1:
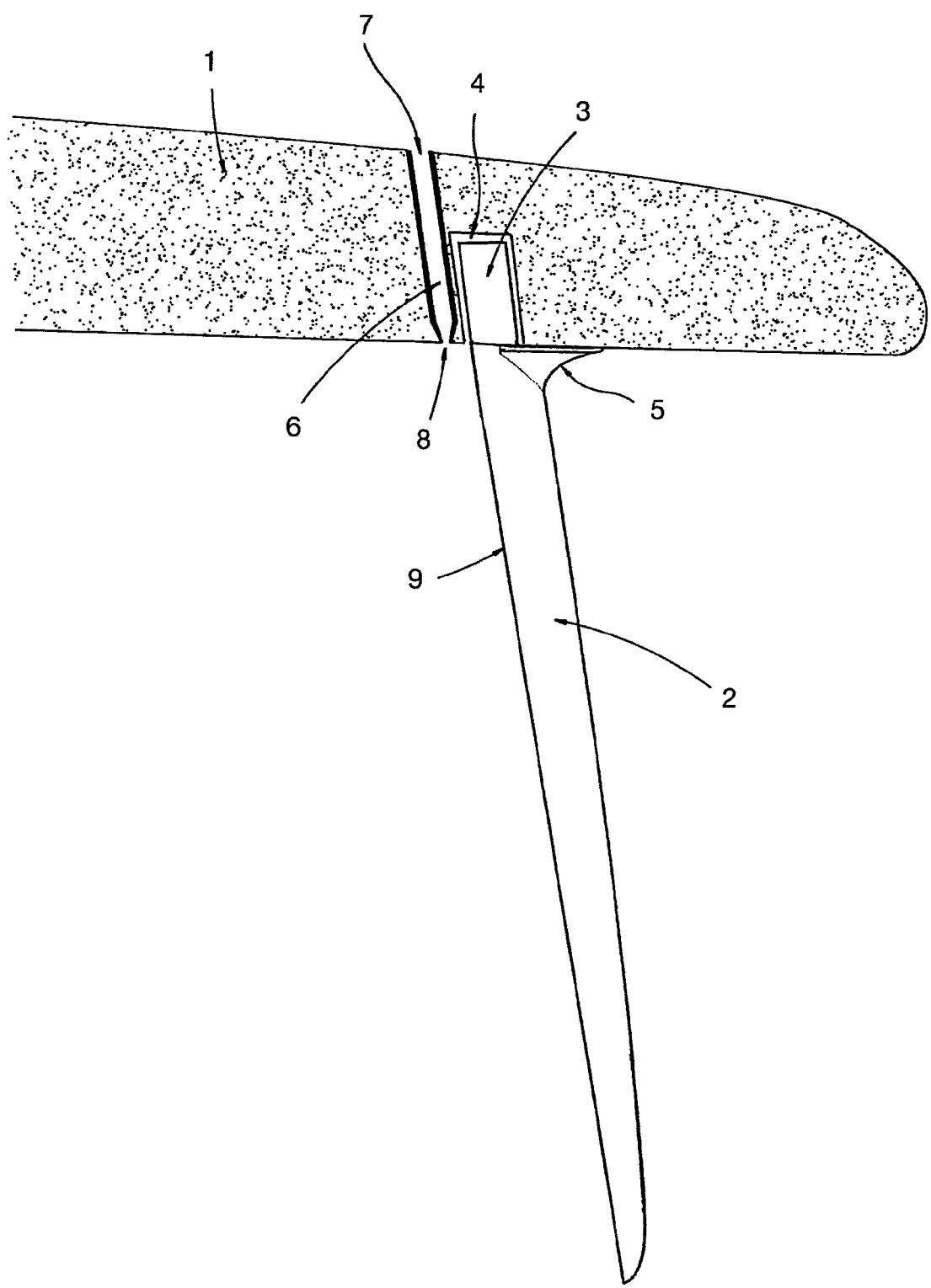
FIG. 1 shows a surfboard 1, mounting a fin 2. The fin is a rear side fin and is canted outwardly downwardly by an amount selected by the surfboard maker in accordance with good practice. The fin 2 is mounted to the surfboard 1 by means of a tongue 3 engaged into socket 4. Again this is known in the surfboard manufacturing art. If desired a bracing flange 5 may be provided on the outer face of the fin 2 to aid in providing stability to the fin 2 in use. One or more conduits 6 are provided which have an air inlet end 7 and an air outlet or exiting end 8. The exiting end 8 is positioned at or adjacent one face of the fin 2. In this case the exiting end 8 is positioned adjacent the face 9 of the fin 2 which is inwardly facing with respect to the board 1. In use air is drawn through the conduit or conduits 6 and released from the exiting end 8 adjacent the face 9 so as to form an air film over at least part of the face 9.
Figure 21:
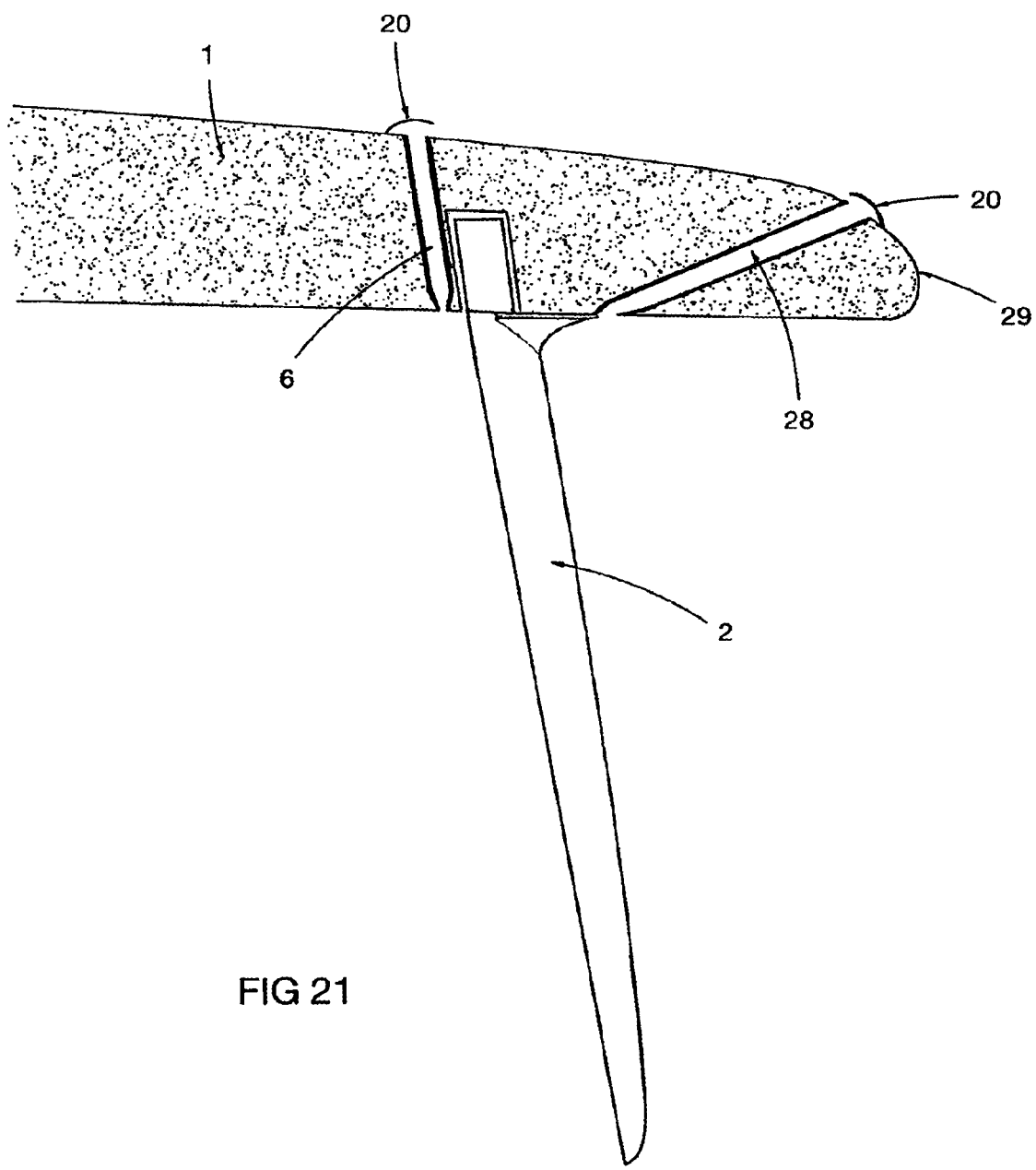

In the construction of FIG. 21 a conduit 6 is provided as for FIG. 1, although other variations could be used. This is supplemented by a second conduit 28 with its inlet at or adjacent the rail 29 of the surfboard 1. The conduit 28 exits adjacent the fin 2 on the outer side thereof but this is for illustrative purposes and other exiting positions previously shown could be utilised. Covers 20 are provided as for other constructions such as FIG. 5.

Figure 22:
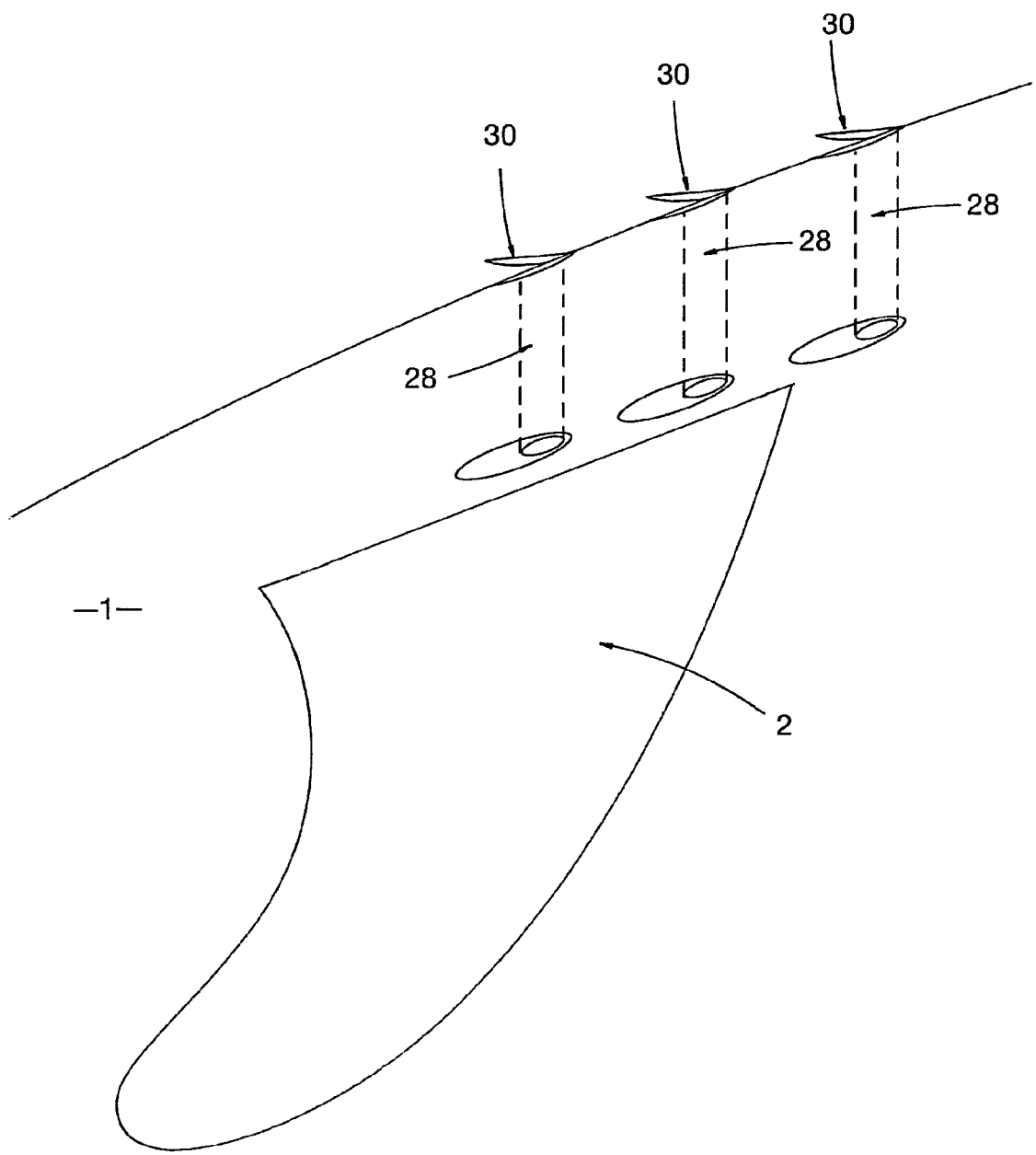
Figure 23:
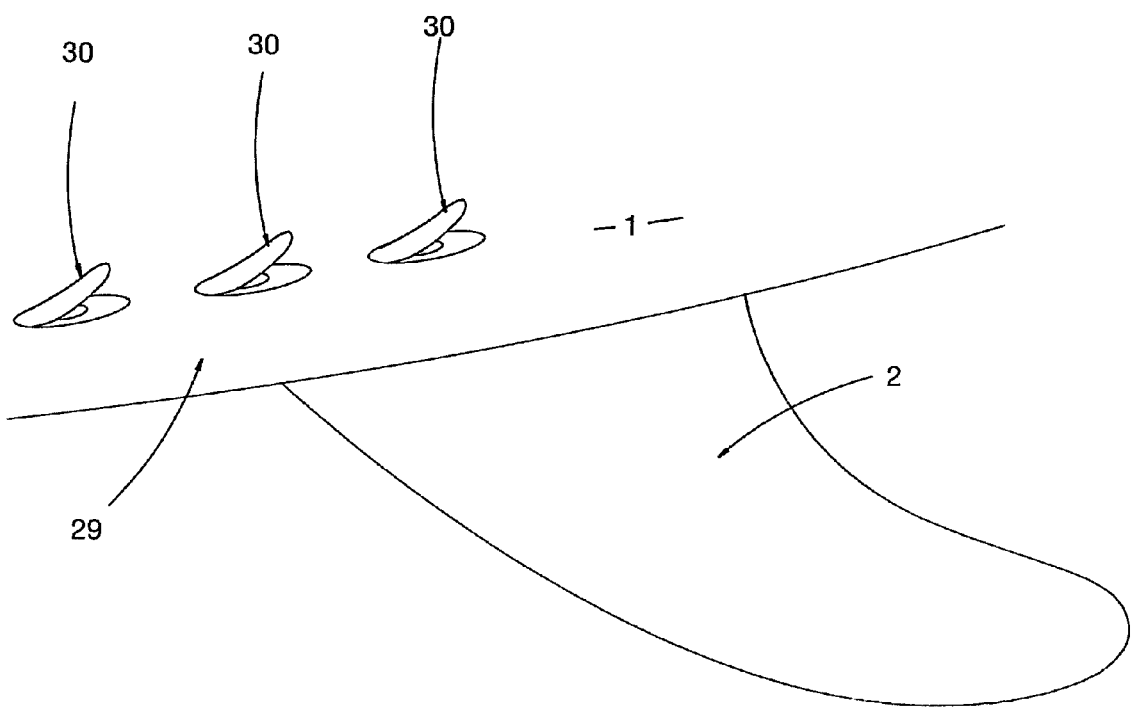

FIGS. 22 and 23 show a construction wherein the conduits 28 are staggered forward of the fin 2. The amount of forward stagger can be empirically determined. However the covers 20 of FIG. 21 have been replaced by a flexible, preferably flexibly resilient cover 30. The purpose of the flexible cover 30 is to close the conduit 28 when the rail 29 becomes submerged during use of the board 1. In such circumstances the water pressure on the cover 30 will cause the cover 30 to close against the inlet to the conduit 28 thereby preventing or at least reducing ingress of water into the conduit 28 while the rail 29 is submerged. Ingress of water into conduit 28 could reduce the effectiveness of the conduit 28 by blocking or at least partially blocking conduit 28.

In use the surfboard 1 or other waterborne craft is provided with a wash of air over, or partly over, one or both sides of the fin or other similar device.

ADVANTAGES

The wash of air over, or partly over, one or both sides of the fin or other similar device is expected to reduce drag on the fin or similar device thereby enabling the performance of the waterborne craft to be increased.

VARIATIONS

Throughout the description of this specification, the word "comprise" and variations of that word such as "comprising" and "comprises", are not intended to exclude other additives, components, integers or steps.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described.

What I claim is:

1. A waterborne craft, comprising:
    a board having an upper surface and a lower surface; and
    a fin extending from the lower surface,
    the board having an air conduit passing through a thickness of the board, the air conduit having an inlet end on or adjacent the upper surface, and an outlet end on the lower surface of the board, the outlet being positioned at or adjacent a leading edge of the fin such that the conduit, in use, provides air to a position at or adjacent to the leading edge of the fin in order to reduce drag to the fin and not the lower surface of the board,
    said air conduit being i) located completely outside of said fin and ii) does not pass through the fin.

2. The waterborne craft as claimed in claim 1, wherein the conduit takes the form of plural apertures through the board.

3. The waterborne craft as claimed in claim 2, wherein the apertures are located at or adjacent the at least one side of the fin.

4. The waterborne craft as claimed in claim 3, wherein the apertures each form an air exit at or adjacent a side of the fin, and each have a reduced diameter at or adjacent the air exit end thereof.

5. The waterborne craft as claimed in claim 2, wherein the apertures each form an air exit at or adjacent a side of the fin, and each have a reduced diameter at or adjacent the air exit.

6. The waterborne craft as claimed in claim 5, wherein the fin has three or four of said apertures located therebeside.

7. The waterborne craft as claimed in claim 2, comprising a plurality of fins,
    wherein the apertures are each positioned to provide air to at least one side face of at least one of said plurality of fins.

8. The waterborne craft as claimed in claim 7, wherein the apertures each form an air exit at or adjacent a side of the fin, and each have a reduced diameter at or adjacent the air exit end thereof.

9. The waterborne craft as claimed in claim 1, comprising a plurality of fins,
    wherein the conduit takes the form of an aperture positioned to provide air to at least one side face of at least one of said plurality of fins.

10. The waterborne craft as claimed in claim 9, comprising a plurality of apertures through the board each located at or adjacent at least one side of at least one of said plurality of fins.

* * * * *